United States Patent [19]

Xu et al.

[11] Patent Number: 5,159,569

[45] Date of Patent: Oct. 27, 1992

[54] FORMATION EVALUATION FROM THERMAL PROPERTIES

[75] Inventors: Hui Xu; Robert Desbrandes, both of Baton Rouge, La.

[73] Assignee: Board of Supervisors of Louisiana State University and Agricultural and Mechanical College, Baton Rouge, La.

[21] Appl. No.: 615,359

[22] Filed: Nov. 19, 1990

[51] Int. Cl.$^5$ .................... E21B 49/00; E21B 49/08; G01K 13/00

[52] U.S. Cl. .................................. 364/422; 73/154; 374/136

[58] Field of Search ................. 364/422; 73/154, 151, 73/152, 153; 374/136

[56] References Cited

U.S. PATENT DOCUMENTS

| | | | |
|---|---|---|---|
| 3,668,927 | 6/1972 | Howell et al. | 73/154 |
| 3,807,227 | 4/1974 | Smith, Jr. | 73/154 |
| 3,864,969 | 2/1975 | Smith, Jr. | 73/154 |
| 3,892,128 | 7/1975 | Smith, Jr. | 73/154 |
| 3,981,187 | 9/1976 | Howell | 73/154 |
| 4,343,181 | 8/1982 | Poppendiek | 73/154 |
| 4,575,261 | 3/1986 | Berger et al. | 374/136 |
| 4,855,912 | 8/1989 | Banavar et al. | 364/422 |
| 4,881,406 | 11/1989 | Coury | 73/154 |

OTHER PUBLICATIONS

Roux et al., "An Improved Approach to Estimating True Reservoir Temperature from Transient Temperature Data," paper presented at a meeting of the Society of Petroleum Engineers (Los Angeles, Apr. 9-11, 1980).

Somerton, et al., "Some Thermal Characteristics of Porous Rocks," Petroleum Trans. AIME, pp. 375-378 (1958).

Earlougher, Advances in Well Test Analysis, pp. 45-48 (1977).

Horner, "Pressure Buildup in Wells," 3d World Petro. Cong. Proc., Sec. II, Preprint 7, pp. 25-43 (1951).

Primary Examiner—Gail O. Hayes
Assistant Examiner—A. Bodendorf
Attorney, Agent, or Firm—John H. Runnels

[57] ABSTRACT

A method for determining thermal characteristics of a geological formation from observations of temperature relaxation in a formation after a temperature perturbation, such as that resulting from circulation of drilling mud. A method of determining petrophysical properties from these thermal characteristics. A method of determining thermal characteristics from petrophysical properties.

9 Claims, 19 Drawing Sheets

Temperature measurements at 4473 ft

Temperature measurements at 4350 ft

Temperature measurements at 4174 ft

Temperature measurements at 5730 ft

Temperature Horner plot at 4473 ft

Temperature Horner plot at 4350 ft

Temperature Horner plot at 4174 ft

Temperature Horner plot at 5730 ft

Comparison between theoretical and measured temperature buildup curves at 4473 ft Comparison between theoretical and measured temperature buildup curves at 4350 ft Comparison between theoretical and measured temperature buildup curves at 4174 ft Comparison between theoretical and measured temperature buildup curves at 5730 ft

FORMATION EVALUATION FROM THERMAL PROPERTIES

BACKGROUND OF THE INVENTION

This invention pertains to the evaluation of geological formations from in situ measurements of thermal properties, particularly the determination of formation heat capacity and thermal conductivity from temperature measurements, and the determination of other formation properties—such as porosity, water saturation, and hydrocarbon saturation—from the measured heat capacity and thermal conductivity, or vice versa.

Roux et al., "An Improved Approach to Estimating True Reservoir Temperature from Transient Temperature Data," paper presented at a meeting of the Society of Petroleum Engineers (Los Angeles, Apr. 9-11, 1980), presents a modified Horner-type method for estimating static formation temperature from temperature buildup data, but does not suggest a method for estimating heat conductivity or heat capacity.

Somerton et al., "Some Thermal Characteristics of Porous Rocks," Petroleum Trans. AIME, pp 375-78 (1958), discusses the relationship between thermal conductivity and volumetric heat capacity of rock, and the rock's composition, porosity, and fluid saturation. The derived relationship for volumetric heat capacity will generally be more accurate than that for heat conductivity.

The "Horner" method has been used previously for measuring formation permeability from pressure buildup measurements. See Horner, "Pressure Buildup in Wells," 3d World Petro. Cong. Proc., Sec. II, Preprint 7 pp. 25-43 (1951), which is incorporated by reference.

Earlougher, *Advances in Well Test Analysis*, pp 45-48 (1977), discusses using a Horner-type method in pressure buildup testing, in which reservoir permeability is estimated from the slope of a Horner plot.

Poppendiek, U.S. Pat. No. 4,343,181, discusses a method for determining the thermal conductivity and heat capacity of the earth, in which a probe heats a limited portion of a formation, and the actual temperature response of the formation is compared to calculated values. At short times, the heat capacity is said to dominate the temperature response curve, and at long times, the thermal conductivity is said to dominate. Because the probe heats only a limited portion of the formation, vertical heat flux affects the measurements. Problems arising from vertical heat flux are not discussed.

Howell, U.S. Pat. No. 3,668,927 discloses a bore hole probe with heating means and temperature measuring means. The slope of a plot of temperature versus logarithm of time is said to be proportional to the thermal conductivity. The method is stated to work either during heating, or during cooling after the heat source is removed. Problems arising from vertical heat flux are not discussed.

Smith, U.S. Pat. Nos. 3,807,227 and 3,892,128, discuss thermal well logging methods for measuring specific heat and thermal conductivity. A single heat source and several thermal detectors are moved through an open or cased bore, and the thermal responses recorded. The specific heat and thermal conductivity are then inferred, and used to make qualitative evaluations of likely locations of water and hydrocarbon deposits. No means for inferring porosity is disclosed. Problems arising from vertical heat flux are not discussed.

Smith, U.S. Pat. No. 3,864,969, has some disclosure cumulative with that of the 3,807,227 and 3,892,128 Patents. This reference discloses a method to determine heat capacity and thermal conductivity by heating one spot within the formation, and then monitoring the temperature relaxation when the heat source is removed. An empirically determined proportionality factor for the specific tool used is determined; there is no disclosure of means for determining heat capacity and thermal conductivity from the temperature measurements alone, without calibration to a specific tool. If the porosity is independently known, an empirical method is given for estimating fluid saturation, content, and type from the measured thermal properties. Problems arising from vertical heat flux are not discussed.

Howell, U.S. Pat. No. 3,981,187, discussed the use of temperature sensors and a single heat source to measure the thermal conductivity of a well casing or a formation. An apparatus comprising the heat source and temperature sensors is moved vertically through the well. The linear portion of a plot of temperature versus logarithm of time is said to have slope Q/k. Heat flux is said to be higher in the vicinity of oil-bearing formations than in the vicinity of non-oil-bearing formations. No means for making quantitative measurements of hydrocarbon saturation is disclosed. Problems arising from vertical heat flux are not discussed. It appears that the apparatus disclosed would not cause heating which is substantially uniform radially, because the heating means contacts only part of the bore hole wall at the depth at which it is located.

Despite the long-felt need for a convenient, inexpensive, easy-to-perform in situ method of measuring formation thermal conductivity, heat capacity, porosity, and water and hydrocarbon saturation levels, both in open and cased wells, at multiple depths, without substantial problems from vertical heat flux, and despite the common availability of apparatus for measuring temperatures inside wells, to the knowledge of the inventors no previous reference has disclosed a practical, working means for making such measurements.

SUMMARY OF THE INVENTION

It is an object of this invention to provide a convenient, easy-to-perform, and relatively inexpensive in situ method to measure formation characteristics such as porosity, water saturation, and hydrocarbon saturation of a geological formation.

It is an object of this invention to provide a convenient, easy-to-perform, and relatively inexpensive method to measure the heat capacity and heat conductivity of a geological formation.

It is an object of this invention to provide a method for making these measurements which may be used either in an open hole or in a cased hole.

It is an object of this invention to provide a method for making these measurements using geophysical log data, particularly using temperature measurements, a method which may be used at multiple depths, without substantial problems from vertical heat flux.

It is a feature of this invention to perturb the temperature of at least a portion of the formation by circulating a fluid through the formation, and then to measure the in situ temperature of the formation as a function of time as the temperature of the formation relaxes from its perturbed state back towards it unperturbed state. From these temperature measurements, the heat conductivity and heat capacity of the formation may be derived. From the heat conductivity and heat capacity, other characteristics of the formation may be derived, such as porosity, water saturation, and hydrocarbon saturation. Estimates of the hydrocarbon saturation and porosity of a formation permit an informed decision to be made as to whether it is desirable to produce hydrocarbons from the formation.

It is an advantage of this invention that these temperature measurements allow the determination of formation heat conductivity and heat capacity, and thereby other characteristics of the formation, such as porosity, water saturation, and hydrocarbon saturation in a manner which is convenient, easy to perform, relatively inexpensive, and which may be performed in an open hole or in a cased hole, without substantial problems from vertical heat flux.

The method of this invention may also be inverted, i.e., thermal properties of a formation such as thermal conductivity and volumetric heat capacity may be derived from measurements of porosity and hydrocarbon saturation.

In addition to use in locating hydrocarbons, the method of this invention should also be useful in geothermal applications, using analogous techniques to determine the porosity and steam content of a formation.

DETAILED DESCRIPTION OF THE INVENTION

Figure 1:
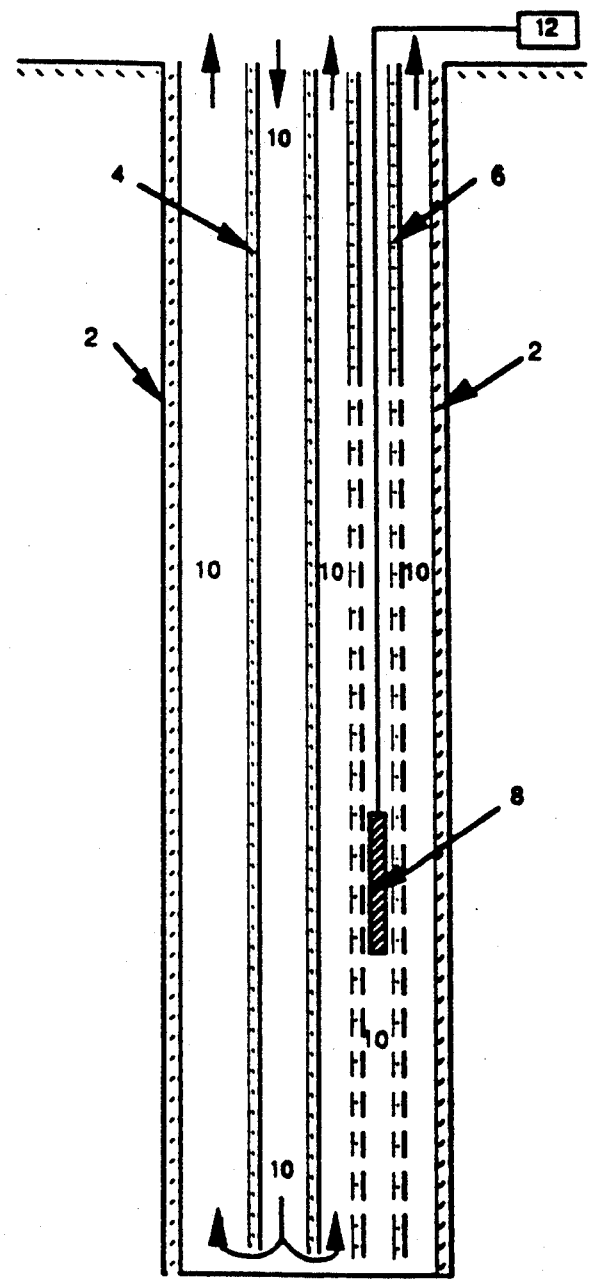
FIG. 1 illustrates the basic apparatus and method for collecting the temperature measurements used in this method.

Apparatus and methods for measuring temperatures inside a bore hole are known in the art, as are apparatus and methods for circulating a fluid such as drilling mud through the bore hole, where the drilling mud has a temperature either hotter or colder than that of the formation.

Thermal characteristics of a formation—such as its thermal conductivity and heat capacity—can be derived from in situ measurements of the relaxation of the temperature of the formation once the source of the temperature perturbation has ceased. It has been discovered that using a circulating fluid to perturb the temperature has advantages over prior, more localized means of temperature perturbation—namely, that heat flux in the vertical direction is minimized, reducing a potential source of complication and error. Once these thermal characteristics are known, other formation characteristics can then be derived from them—for example, porosity, water saturation, and hydrocarbon saturation.

"Heat conductivity," or k, is the rate of heat conduction through a unit area and a unit thickness of a material subjected to a unit temperature difference. "Volumetric heat capacity," or $\rho c$, is the quantity of heat required to raise the temperature of a unit volume of a material by one degree.

Although other means for perturbing formation temperature will work in practicing this invention, a convenient means will frequently be to circulate a fluid (such as a drilling mud) through a bore hole in the formation, where the fluid has a temperature different from that of the formation—typically, but not necessarily, a temperature lower than that of the formation. The temperature perturbation should be applied over a range of depths to minimize heat flux in the vertical direction. For simplicity, the following discussion assumes that the perturbation lowers the formation temperature at the depth or depths of interest, and that the perturbation is caused by circulation of a fluid having a temperature lower than that of the formation. However, the principles involved equally apply if the perturbation increases the temperature, or if the temperature perturbation is caused by another means.

The in situ measurement comprises two parts: the "temperature drawdown" (or perturbation) while the colder fluid is circulated, and the "temperature buildup" (or relaxation) once the fluid circulation ceases. This invention primarily uses measurements from the buildup or relaxation phase, but also uses some measurements from the drawdown or perturbation phase.

It has been discovered that a modified Horner method may be used to determine thermal properties from temperature measurements. The dimensionless "Horner Time" $t_H$ is defined to be $t_H = t/(t_p + t)$; where t is the temperature buildup time, or elapsed time following the end of the temperature perturbation; and $t_p$ is the heat production time, the total drawdown time, or time during which the perturbation is applied.

The wellbore storage factor a may be defined as $$a = \rho_f c_f / 2\rho c$$

where $\rho_f$ and $c_f$ are the wellbore fluid density and heat capacity, respectively, and $\rho$ and c are the formation density and heat capacity. The wellbore storage factor a affects both temperature buildup and temperature drawdown.

It has been found that for wellbore storage factors in the range of a $=0.5$ to $a=1.5$ (a range commonly encountered in practice), a modified Horner method can be a useful approximation. See Xu, "Formation Evaluation Using Temperature Buildup Curves," Ph. D. Dissertation, Louisiana State University (May 1990), which is incorporated by reference, with particular reference to pp. 63–66 and 68–70. The derived approximation is $$m = 0.150 \, q/k$$

where q is the heat flow rate during temperature drawdown, and m is the slope of the linear portion of a plot of the temperature versus the logarithm of the Horner time $t_H$. This slope m should typically be measured between about five and about twenty hours after the source of the temperature perturbation has stopped. From this equation, k can be derived if q is known.

The heat flow rate q, in turn, can be estimated if it is assumed that q is a linear function of depth, $q = Az + B$, where A and B are constants, and z is the depth. Integrating this expression over all depths gives the total heat flow rate Q in Watts: $Q = \frac{1}{2}AD^2 + BD$, where D is the total depth of the well. Calculation of Q is straightforward from measurements or other knowledge of input and output fluid temperatures, fluid volumetric heat capacity, and fluid flow rate.

A second equation is needed to solve for the two unknowns A and B. This second equation comes from the depth $z_o$ at which the static formation temperature and the output fluid temperature are the same, so that $q = 0$. This depth $z_o$ may be easily measured. At $z_o$, $q = A + Bz$ becomes $0 = A + Bz_o$. The two unknowns A and B may then be solved.

Then the estimated q at any depth of interest may be derived, from which k may be derived.

The thermal diffusivity $\alpha$ is the rate at which heat is conducted during unsteady-state heat transfer, and is defined to be the ratio of heat conductivity to volumetric heat capacity: $\alpha = k/\rho c$. Thus once the thermal conductivity k has been measured, the volumetric heat capacity $\rho c$ may be determined if the thermal diffusivity $\alpha$ is known.

The thermal diffusivity, in turn, may be measured by calculating theoretical dimensionless temperature buildup curves for different values of $\alpha$, and determining which curve best matches the experimental temperature data. Such curves may be calculated from Duhamel's principle; see Lee, "Well Testing," SPE Textbook Series, vol. 1, pp. 21–22 (1982), which is incorporated by reference. See also Xu, supra, pp. 66–72, which is incorporated by reference.

EXAMPLES

Measurements were taken at different depths in a Louisiana State University test well located in East Baton Rouge Parish, Louisiana. Temperature measurements were made both during temperature drawdown, when cold fluid was circulated through the well, and during temperature buildup, after fluid circulation stopped.

FIG. 1 illustrates one manner of taking these measurements. Casing 2 within the well enclosed tube 4, partially perforated tube 6, and thermometer 8 within partially perforated tube 6. Fluid 10, a drilling mud, flowed for a time down through tube 4, and then up through casing 2. Thermometer 8, held at the depth of interest, or moved through several depths of interest, monitored the temperature during both the temperature drawdown and the temperature buildup phases, and the temperatures thus measured were recorded continuously or at periodic intervals by recorder 12. Temperatures of the inflowing and outflowing fluid 10 at the wellhole were also monitored and recorded.

Measurements in the test well were taken at four different depths. From interpretations of prior neutron log measurements in the same well, one of the four depths had previously been inferred to be in a gas-bearing zone, one in a residual gas-bearing zone, and the other two in water-bearing zones. Table 1 gives information regarding the four measurements.

TABLE 1

| Run No. | Depth (ft) | Interpretation by Pulsed Neutron Log | Mud Circulation Time (hr.) | Temperature Buildup Time (hr.) |
| --- | --- | --- | --- | --- |
| 1 | 4473 | gas zone | 6 | 42.5 |
| 2 | 4350 | water zone | 6 | 46.25 |
| 3 | 4174 | residual gas zone | 12 | 45.25 |
| 4 | 5730 | water zone | 12 | 44.5 |

Figure 2:
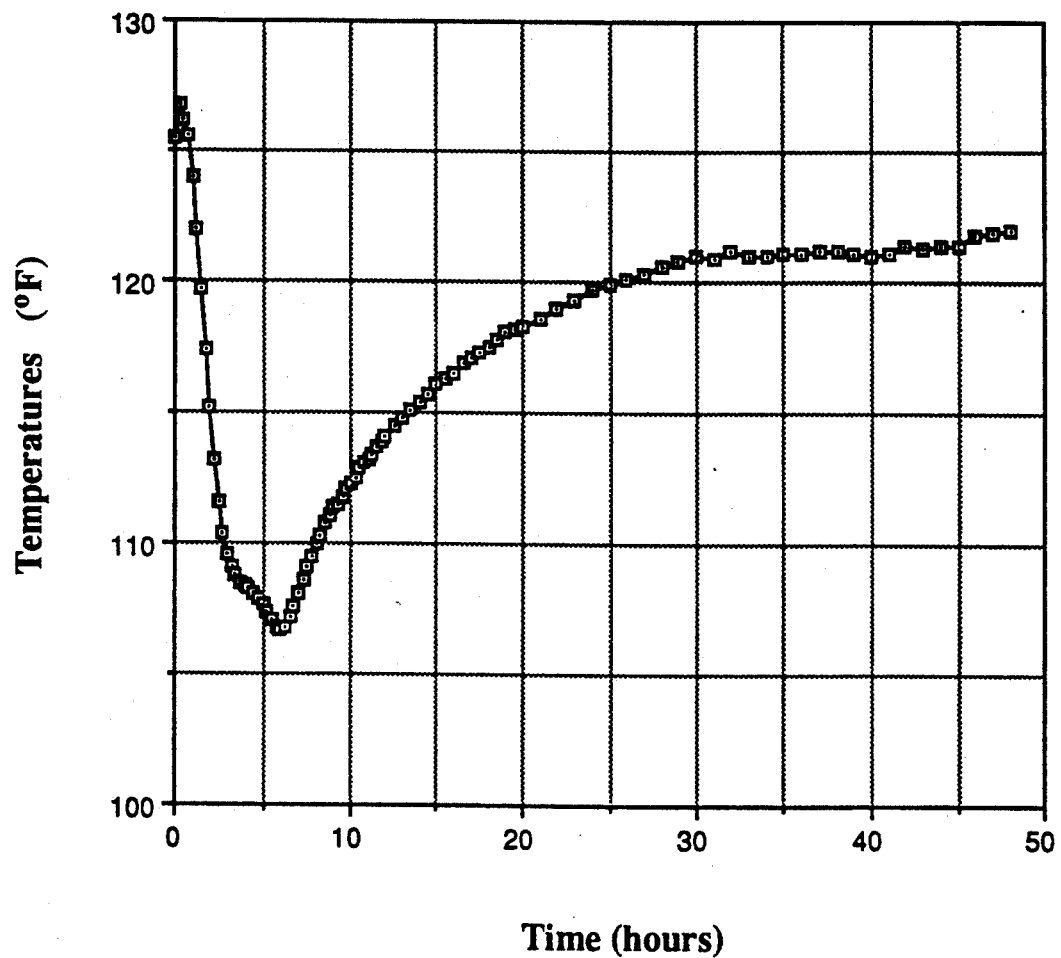
FIGS. 2, 3, 4, and 5 illustrate temperature measurements taken at four different well depths.
Figure 3:
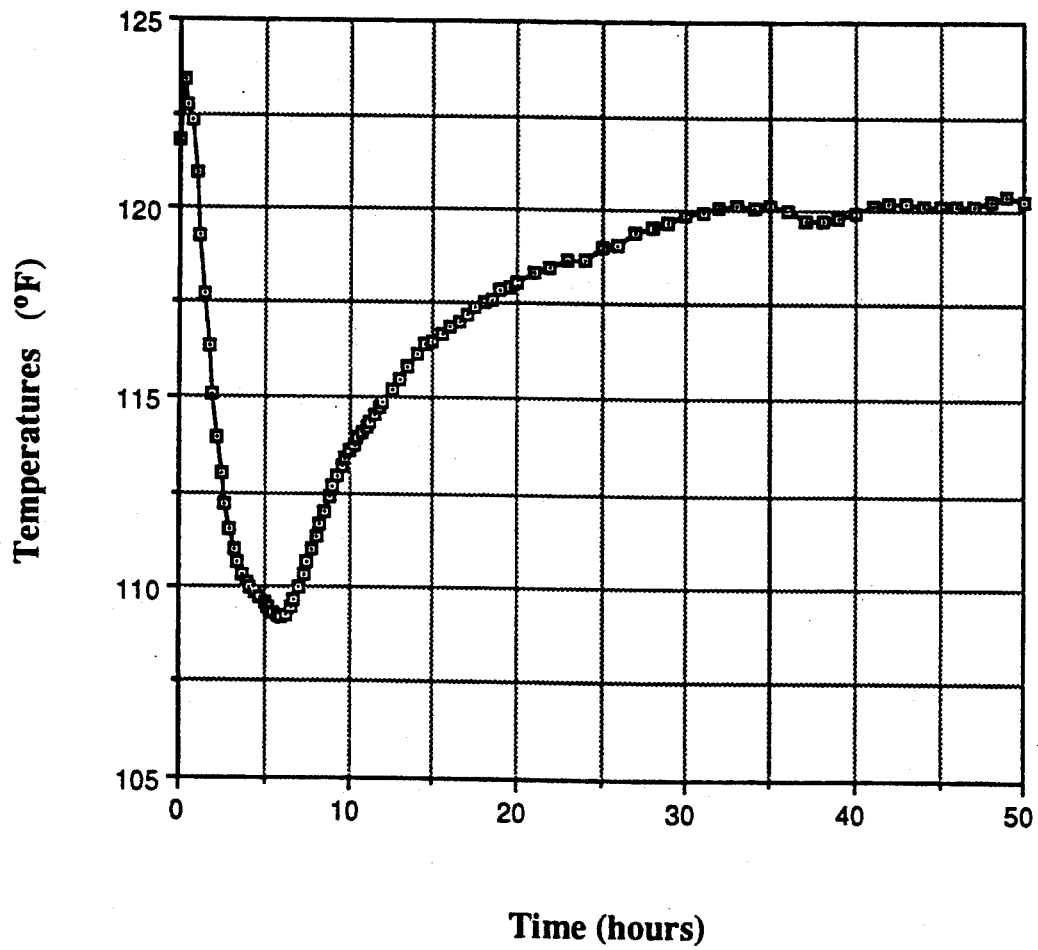
Figure 4:
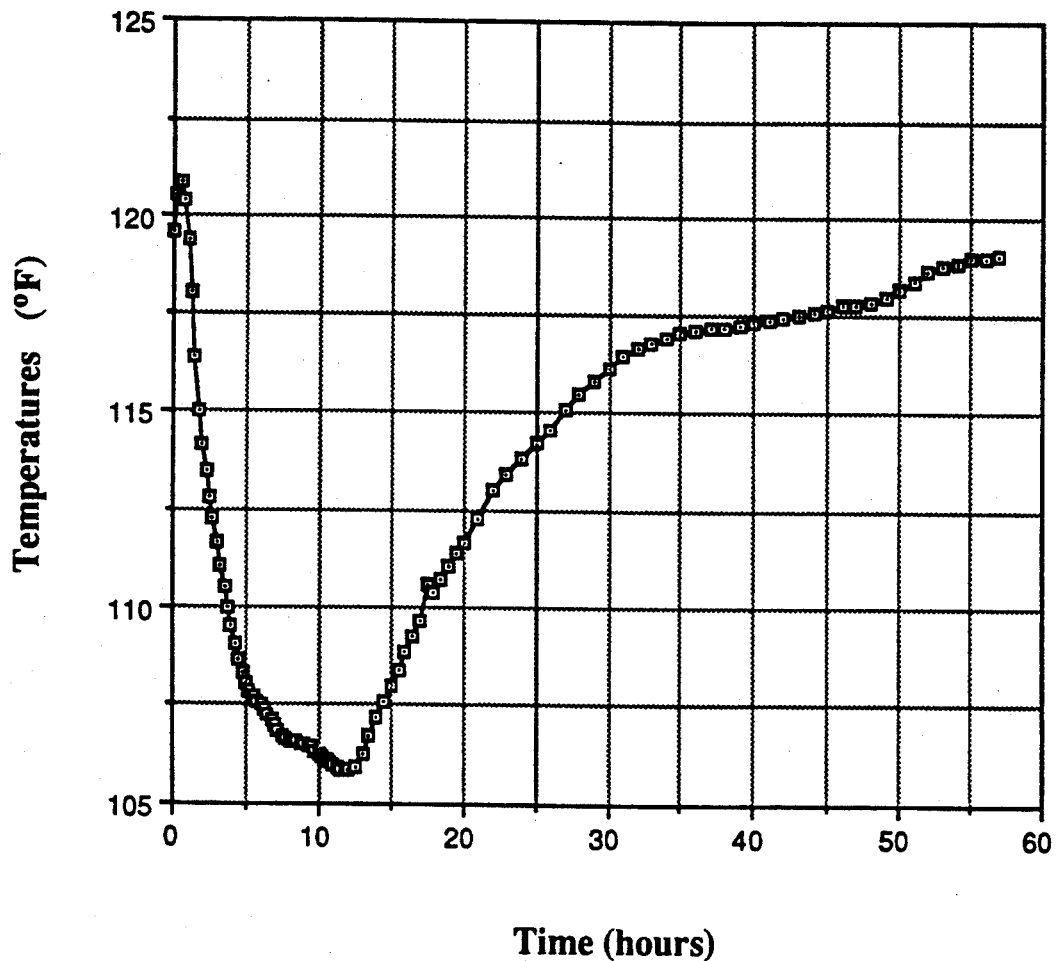
Figure 5:
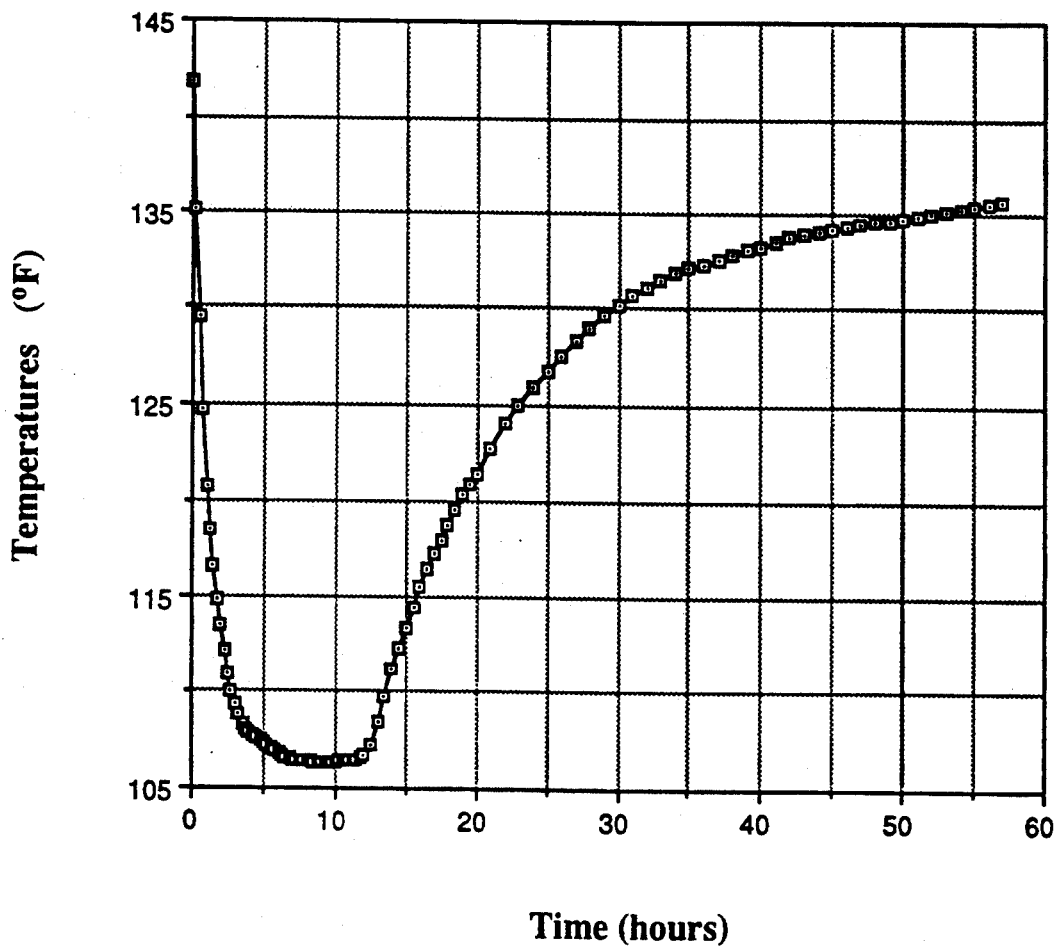

FIG. 2 illustrates the temperature measurements for run 1, at 4473 ft; FIG. 3, those for run 2, at 4350 ft; FIG. 4, those for run 3, at 4174 ft; and FIG. 5, those for run 4, at 5730 ft.

In FIGS. 2, 3, and 4, brief increases in temperature were seen at the beginning of the mud circulation. These increases were attributed to the fact that in these three runs, the thermometer was not at the bottom of the well, so that initially hot fluid circulating up from the bottom of the well increased the temperature slightly. This temperature increase was not observed in run 4, FIG. 5, because in that run the thermometer was close to the bottom of the well.

The temperature logging tool was calibrated both before and after each run to improve the accuracy of the temperature measurements.

For example, Table 2 gives the input and output mud temperatures at the wellhead, and the formation temperature at 4350 ft during Run 2.

TABLE 2

| Time (Hours) | Input Mud Temperature (°F.) | Output Mud Temperature (°F.) | Mud Temperature Differences (°F.) | Temperature At 4350 ft (°F.) |
| --- | --- | --- | --- | --- |
| 0 | 62.5 | 68.9 | 6.4 | 121.2 |
| 1 | 68.9 | 75.7 | 6.8 | 120.9 |
| 2 | 74.7 | 80.4 | 5.7 | 114.9 |
| 3 | 80.4 | 84.0 | 3.6 | 111.4 |
| 4 | 84.5 | 87.2 | 2.7 | 110.2 |
| 5 | 86.6 | 88.8 | 2.2 | 109.7 |
| 6 | 88.0 | 90.1 | 2.1 | 109.2 |

The average temperature change was 4.2° F.; the average input mud temperature was 78.4° F.; the average output temperature was 82.6° F.; and the average temperature at 4350 ft was 113.7° F. If a linear relationship is assumed to exist between the output mud temperature at the wellhead and the output mud temperature at any depth z (in ft) within the well, then the output mud temperature as a function of depth was $$T_{out} = 82.6° \, F. = (0.00715° \, F./ft.)(z)$$

Figure 6:
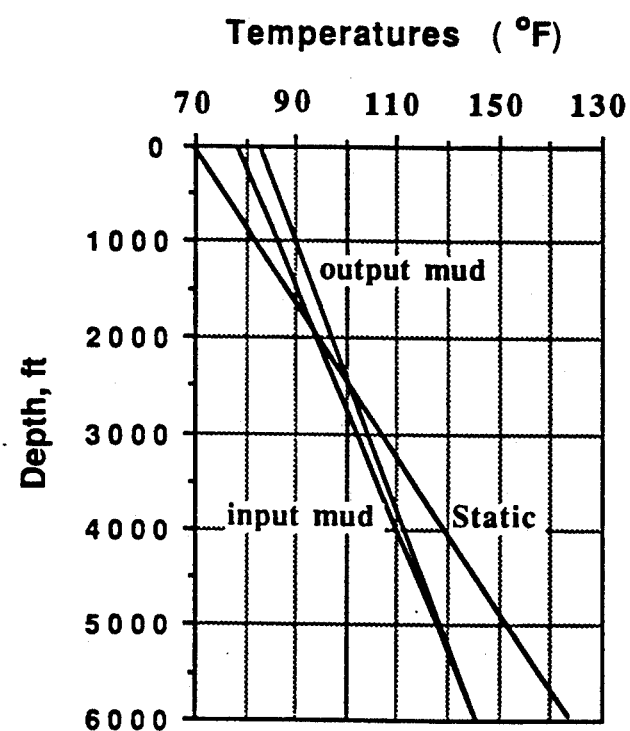
FIG. 6 illustrates input mud temperature, output mud temperature, and static formation temperature as a function of depth.

FIG. 6 illustrates input mud temperature, output mud temperature, and static formation temperature as a function of depth. Output mud temperature and static formation temperature were equal at a depth of about 2630 feet.

The average total heat flow rate caused by the mud circulation was calculated as $$Q = F \rho c_f T_{avg}$$

where F is the circulating fluid flow rate, $p_f c_f$ is the circulating fluid volumetric heat capacity, and $T_{avg}$ is the average circulating fluid temperature change. The circulating fluid flow rate was 100 gal/min; the volumetric heat capacity of the circulating fluid was 2.733° C. Thus the average total heat flow rate Q was 72.1 kW.

The heat flow rate q at a given depth within the well should be approximately proportional to the difference between the formation static temperature and the output mud temperature at that depth. Because these temperatures are assumed to be linear functions of depth, it follows that q is approximately a linear function of depth z:

$$q = Az + B$$

where A and B are constants.
From above, $$Q = \tfrac{1}{2}AD^2 + BD = 72.1 \text{ kW}$$

$$D = 6000 \text{ ft (in the LSU test well)}$$

$$q = 0 \text{ at } 2630 \text{ ft, or}$$

$$0 = A(2630 \text{ ft}) + B$$

Solving these two equations in two unknowns gives $$A = 0.0325 \ W/\text{ft}^2$$

$$B = -85.40 \ W/\text{ft}$$

FIGS. 7, 8, 9, and 10 give semilog plots of the four temperature measurements during the temperature buildup phase, as a function of the dimensionless Horner time $t_H$.

Figure 7:
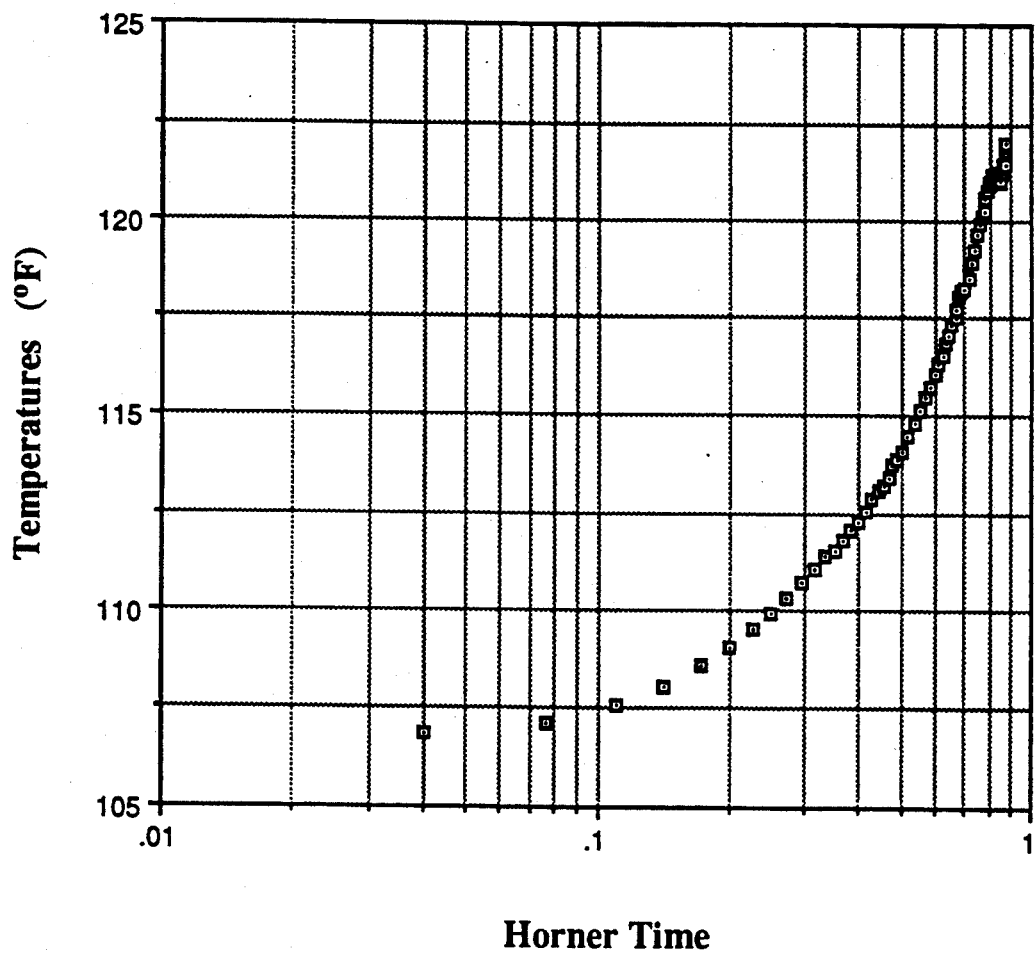
FIGS. 7, 8, 9, and 10 illustrate semilog plots of temperature as a function of dimensionless Horner time, at four different well depths.
Figure 8:
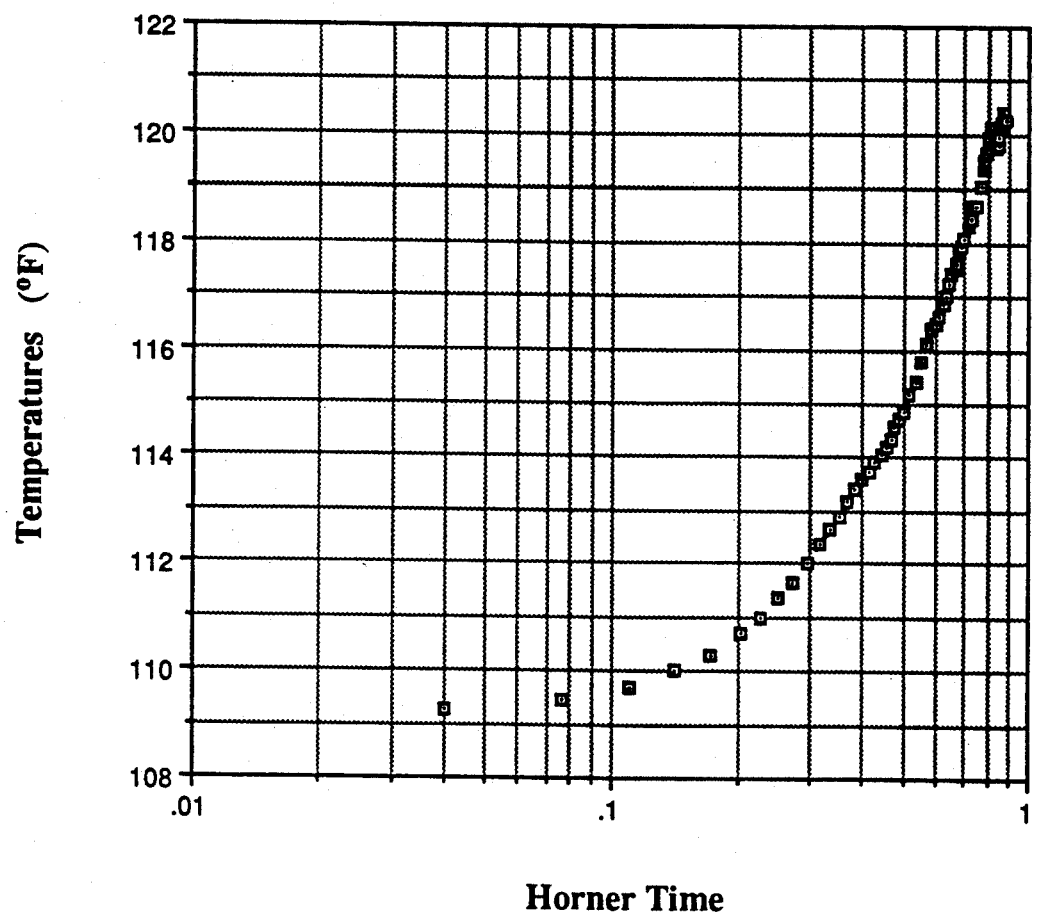
Figure 9:
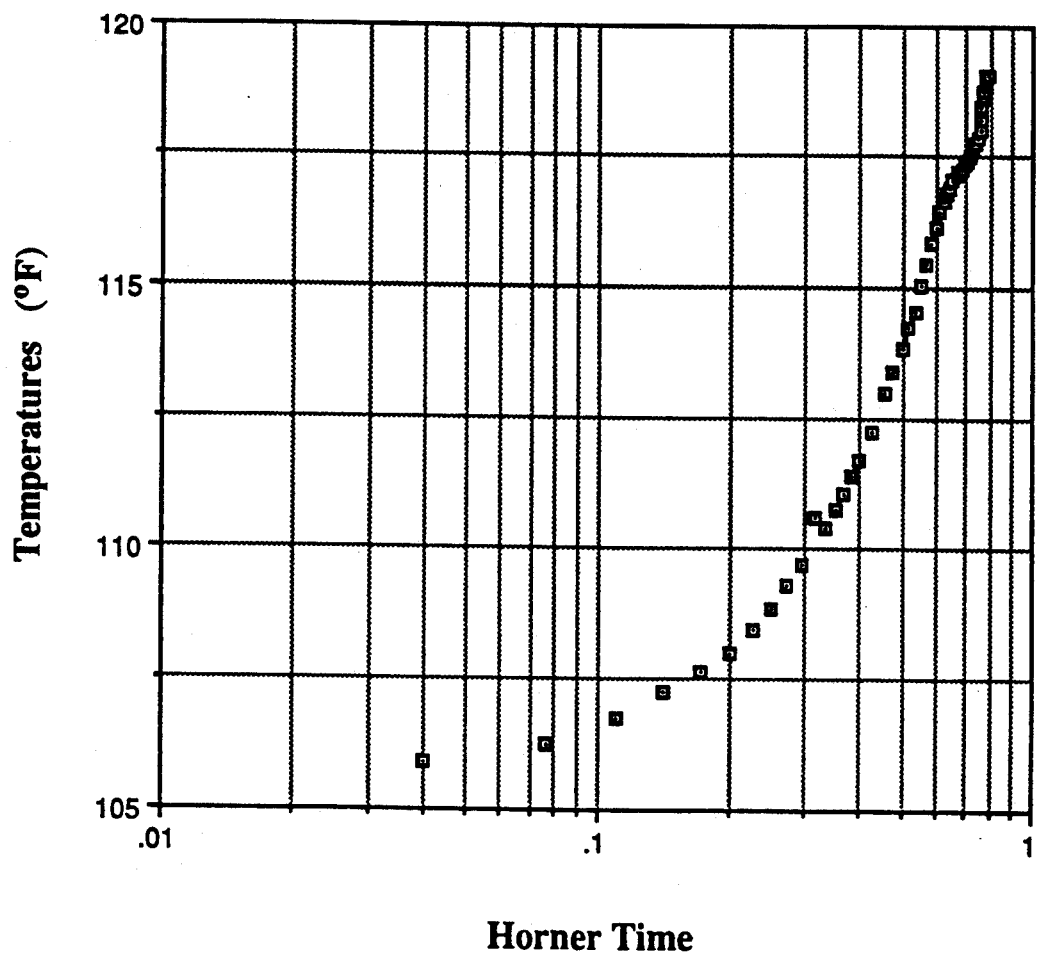
Figure 10:
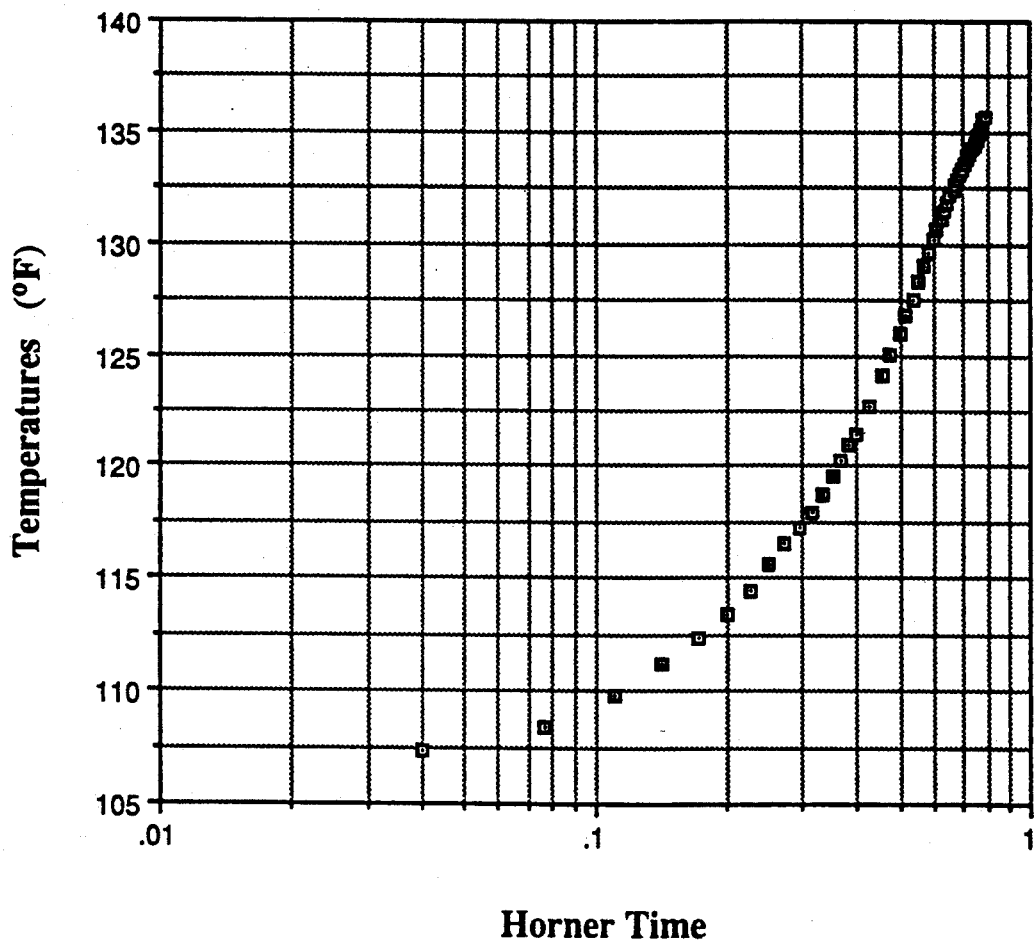

In FIG. 7, for example, the best fit for the slope of the straight line portion of the curve was 39.5° F./ log cycle, or 21.9° C./ log cycle. The formation depth was 4473 ft. The heat flow rate q was calculated to be 196.76 W/m. The heat conductivity k was then calculated to be k = 1.353 W/m °K. These properties for the other three tested depths were calculated in the same manner, and the calculations are summarized in Table 3.

TABLE 3

| Run | Depth, ft | Slope, °C./log cycle | k, W/m °K. | Remarks |
|---|---|---|---|---|
| 1 | 4473 | 21.9 | 1.353 | Gas zone |
| 2 | 4350 | 12.7 | 1.988 | Water zone |
| 3 | 4174 | 15.1 | 1.794 | Residual gas zone |
| 4 | 5730 | 26.2 | 1.914 | Water zone |

The next step was to define dimensionless parameters $T_D$ for temperature, and $t_D$ for time:

$$T_D = 2pk(T_i - T)/q$$

$$t_D = kt/(pc r_w^2) = \alpha t / r_w^2$$

where
T is the formation temperature
$T_i$ is the initial formation temperature (before perturbation)
$r_w$ is the well radius A theoretical relationship between $T_D$ and $t_D$ is chosen, and the value of $\alpha$ is varied to find the best fit to the experimental data. Such theoretical relationships are discussed in Xu, supra, pp. 58-63, 66-68, 70-72, and 120-130, which is incorporated by reference. A particularly useful relationship from this work is the following, from p. 61:

$$T_D = \frac{4}{\pi} \int_0^\infty \frac{(1 - e^{-u^2 t_D})du}{u^3\{[auJ_0(u) - J_1(u)]^2 + [auY_0(u) - Y_1(u)]^2\}}$$

where $J_0$ and $J_1$ are the first kind Bessel functions of zero and first orders, respectively; and $Y_0$ and $Y_1$ are the second kind Bessel functions of zero and first orders, respectively. This integral can be solved by numerical methods. For many purposes, a polynomial approximation to this relationship is sufficiently accurate, such as the following third-order polynomial:

$$T_D = a_0 + a_1(\log t_D) + a_2(\log t_D)^2 + a_3(\log t_D)^3$$

where $a_0$, $a_1$, $a_2$, and $a_3$ are constants whose values can be determined by a least squares fit or other statistical fit.

Then theoretical formation temperature buildup curves for different values of the thermal diffusivity may be compared with the experimental data to determine the best fit, giving the measured value for the thermal diffusivity.

Figure 11:
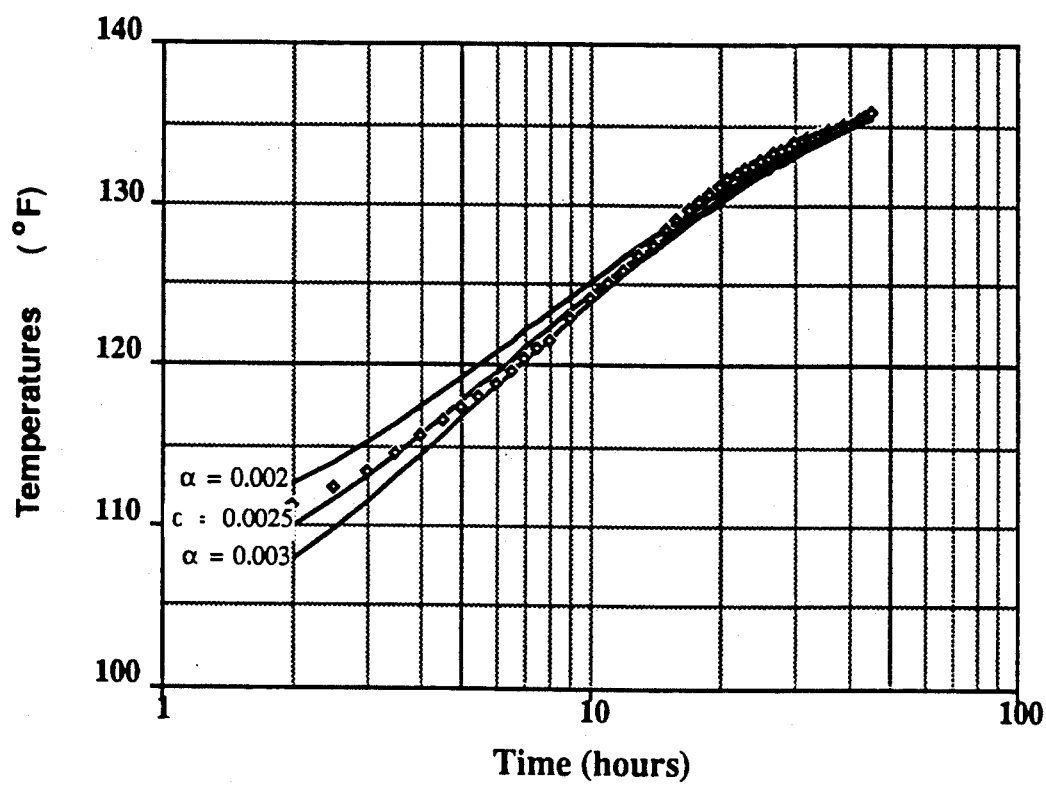
FIG. 11 illustrates a semilog plot of temperature versus time at a given depth, both for actually measured temperatures, and for theoretically calculated temperatures with different thermal diffusivities.
Figure 12:
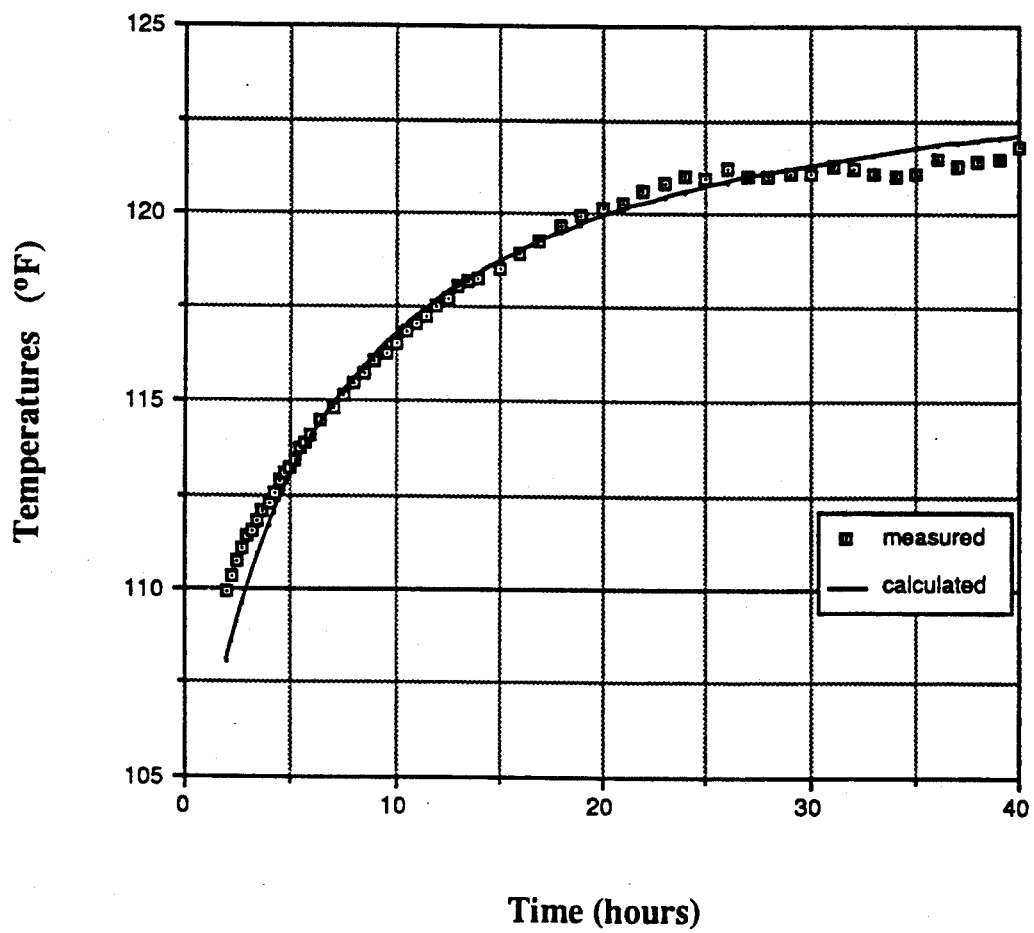
FIGS. 12, 13, 14, and 15 illustrate comparisons of measured and calculated temperatures as a function of time, at each of four different well depths.
Figure 13:
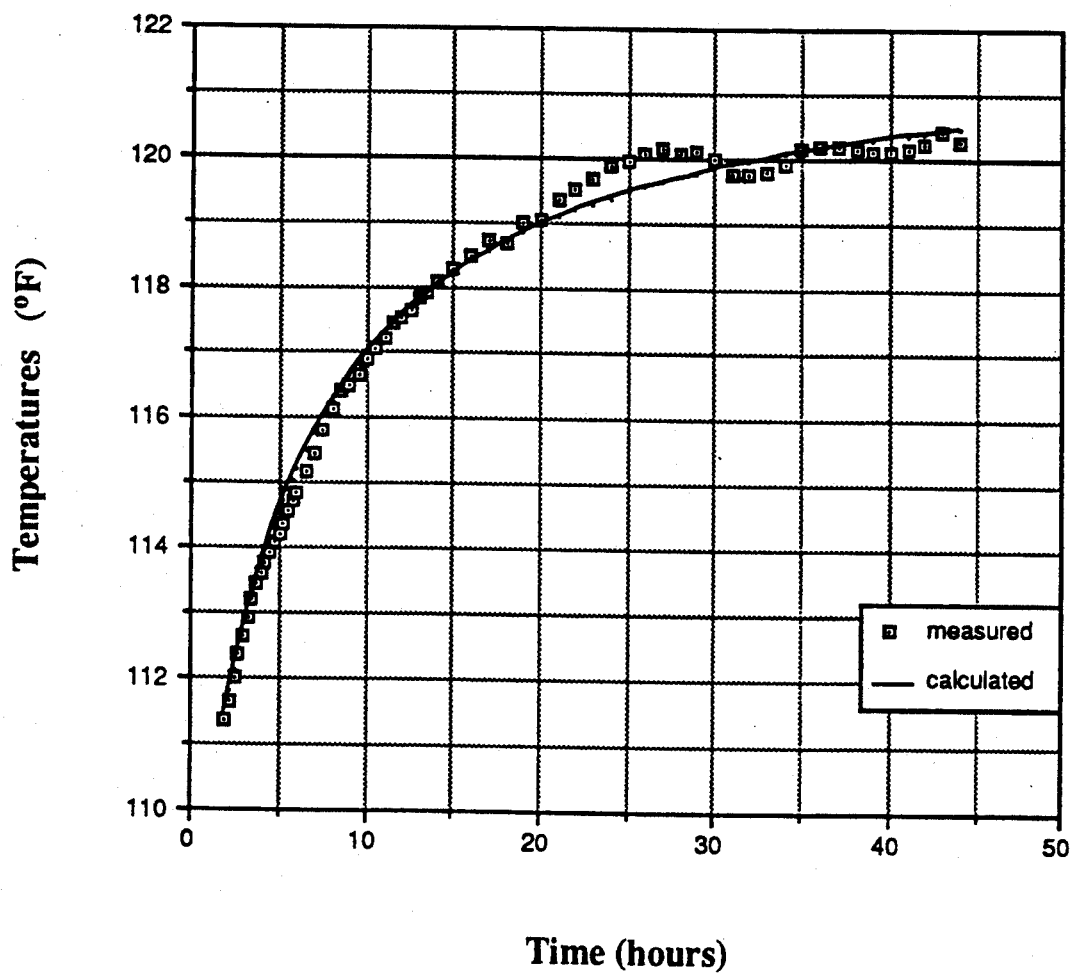
Figure 14:
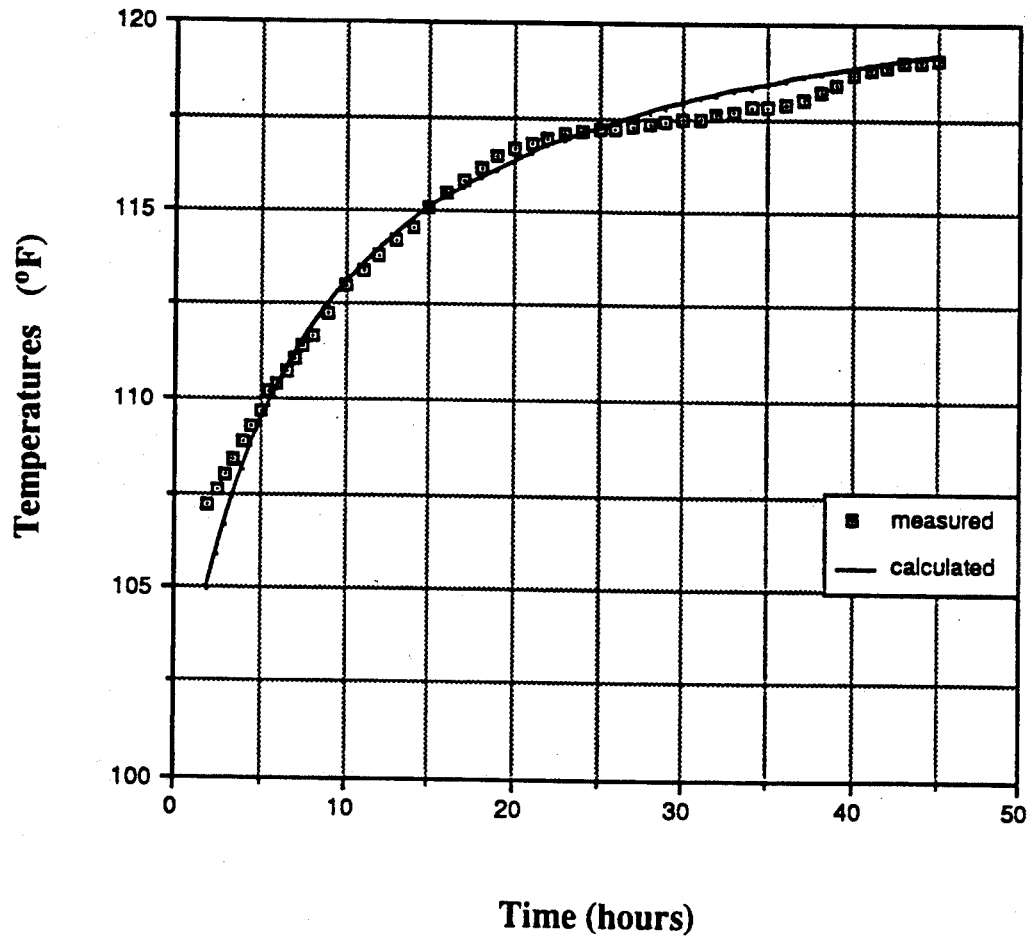
Figure 15:
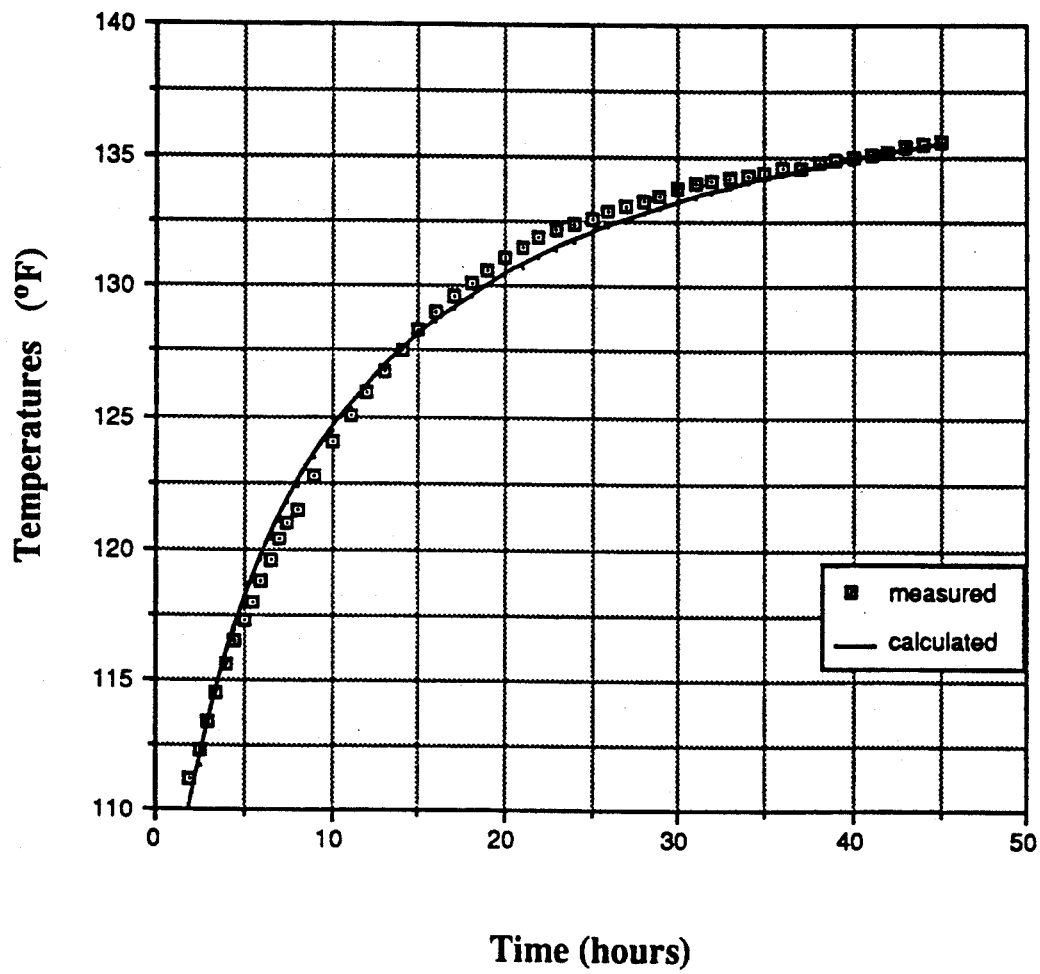

For Run 4, at 5730 ft, FIG. 11 illustrates a semilog plot of the temperature buildup both for the measured temperatures, and for the theoretical temperatures calculated from the above equations, using values for coefficients $a_0$, $a_1$, $a_2$, and $a_3$ for three different thermal diffusivities: $\alpha = 0.002, 0.0025$, and $0.003$. The best fit to the experimental data was with $\alpha = 0.0025$. Finer increments in the values of $\alpha$ thus tested should yield an even better fit for the measured value of $\alpha$.

So using the derived measurements of k and $\alpha$, the volumetric heat capacity may be calculated:

$$pc = k/\alpha = 2756 \text{ kJ/m}^3 \text{°K}.$$

The results of the calculations for each of the four depths are summarized in Table 4.

TABLE 4

| Run No. | Depth, ft | k, W/m °K. | pc, W/m³ °K. | Remarks |
|---|---|---|---|---|
| 1 | 4473 | 1.353 | 1948 | Gas zone |
| 2 | 4350 | 1.988 | 2863 | Water zone |
| 3 | 4174 | 1.794 | 2584 | Residual gas zone |
| 4 | 5730 | 1.914 | 2756 | Water zone |

FIGS. 12, 13, 14, and 15 compare the measured and calculated temperature curves at each of the four depths. Close matches were obtained. Total error in thermal conductivity measurements was ±3%, and in heat capacity measurements was ±15%.

The motivation for calculating formation thermal properties will frequently be to evaluate formation characteristics for hydrocarbon production potential. Somerton, "Some Thermal Characteristics of Porous Rocks,"Trans. AIME, vol. 213, pp. 375-78 (1958) concluded that the overall volumetric heat capacity of a fluid-saturated porous rock can be expressed as the mass-weighted sum of the heat capacities of the individual rock components:

$$pc = (1-\phi)p_m c_m + \phi S_w p_w c_w + \phi S_o p_o c_o + \phi S_g p_g c_g$$

where $c_m$, $c_w$, $c_o$, and $c_g$ are the heat capacities of the rock matrix, water, oil, and gas, respectively; $\rho_m$, $\rho_w$, $\rho_o$, and $\rho_g$ are the densities of the rock matrix, water, oil, and gas, respectively; $S_w$, $S_o$, and $S_g$ are the saturations of water, oil, and gas, respectively; and $\phi$ is the porosity of the rock.

A number of prior numerical relationships have been suggested between rock characteristics and thermal conductivity. The inventors have derived a new such relationship. See Xu, supra, pp. 31–40, which is incorporated by reference, for a discussion of both the prior work, and the inventors' new relationship, which is $$k = k_m^{(1-n\phi)} (k_w S_w + k_o S_o + k_g S_g)^{n\phi}$$

where k is the net thermal conductivity; $k_m$, $k_w$, $k_o$, and $k_g$ are the thermal conductivities of the rock matrix, water, oil, and gas, respectively, and n is a number between 1 and 2. The value of n may be determined by core analysis, or may be known from other regional geological formation knowledge.

The error arising from the above two equations is $\pm 2.5$ porosity units for $\phi$ (equivalent to $\pm 10\%$ if $\phi = 25\%$), and $\pm 7$ saturation units for S (equivalent to $\pm 14\%$ if $S = 50\%$).

The above two equations, together with the material balance equation $S_o + S_w + S_g = 1$ yield three equations in four unknowns. However, at any given depth within a formation, it will usually be true that $S_o = 0$ or $S_g = 0$, (or both); and it may be qualitatively determined by means known in the art whether a given region is an oil-bearing region or a gas-bearing region. Thus from knowledge of whether $S_o = 0$ or $S_g = 0$, one unknown may be eliminated. The subscript "h" (for hydrocarbon) is used below generically to designate those parameters corresponding to oil, to gas, or to air—whichever is present in a particular region. (For example, in an oil-bearing region, $\rho_h$ is the density of oil; in a gas-bearing region, $c_h$ is the heat capacity of gas.) The three equations above may then be rewritten:

$$\rho c = (1-\phi)\rho_m c_m + \phi S_w \rho_w c_w + \phi S_h \rho_h c_h$$

$$\log(k) = (1-n\phi)\log(k_m) + n\phi \log(k_h S_h + k_w S_w)$$

$$S_h + S_w = 1$$

Figure 16:
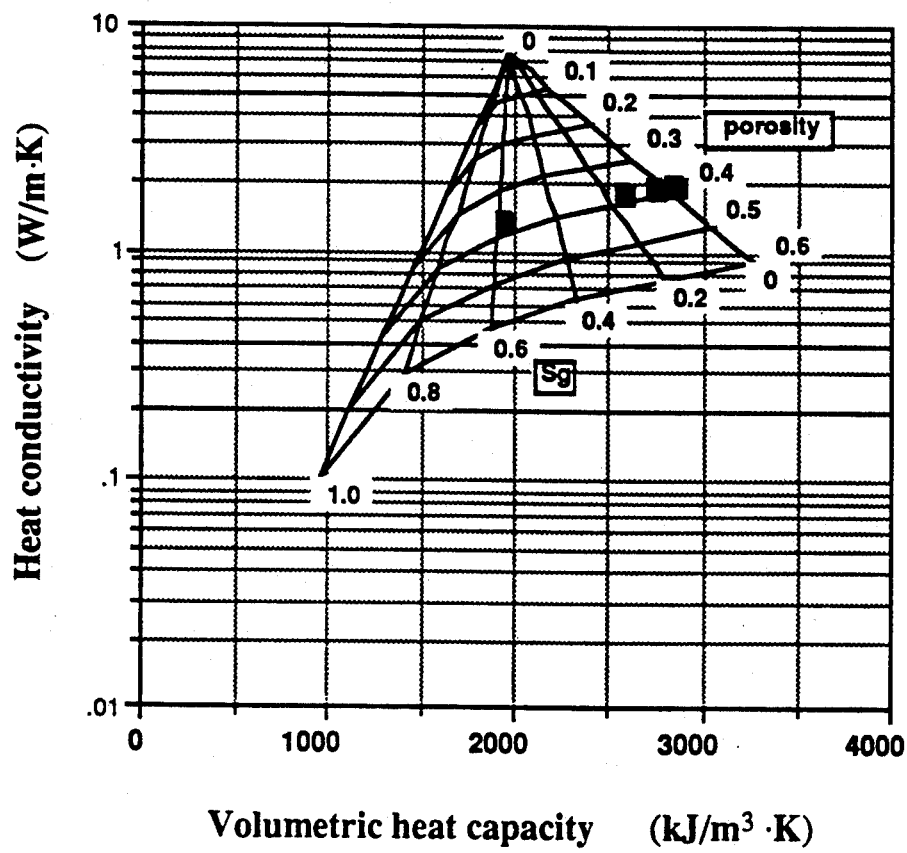
FIG. 16 illustrates a crossplot correlating values of heat conductivity and volumetric heat capacity to values of porosity and gas saturation.

A graphical solution can be represented by a semilog crossplot. Crossplot techniques are widely used in conventional log interpretation. A heat conductivity vs. volumetric heat capacity crossplot may also be constructed for formation interpretation. Specifically, the abscissa of the crossplot is the volumetric heat capacity in linear scale, and the ordinate, the heat conductivity in logarithmic scale. Values for $\rho_m$, $c_m$, $\rho_h$, $c_h$, $\rho_w$, $c_w$, $k_m$, $k_h$, and $k_w$ will be known from other sources or other data, or may otherwise be measured. Then by selecting a value for $S_h$, and varying the value of $\phi$ (or vice versa), a set of values for $\rho c$ and k may be calculated. The procedure is repeated for a different value of $S_h$ (or $\phi$). In this manner, a number of calculated $\rho c$ and k values for different $S_h$ and $\phi$ may be obtained. The calculated data are plotted into the semilog plot of $\rho c$ versus k. Interpolations between points with the same $S_h$, and between points with the same $\phi$, give two sets of curves. Further details on preparing such crossplots and examples of such crossplots are found in Xu, supra, pp. 42–46 and 115–29, which is incorporated by reference. FIG. 16 illustrates a heat conductivity versus volumetric heat capacity crossplot for the following input data:

$\rho_m = 2650$ kg/m³    $\rho_h = 1.02$ kg/m³    $\rho_w = 999.8$ kg/m³
$c_m = 0.74$ kJ/kg·K    $c_h = 1.005$ kJ/kg·K    $c_w = 4.182$ kJ/kg·K
$k_m = 7.7$ W/m·K    $k_h = 0.0257$ W/m·K    $k_w = 0.602$ W/m·K
$n = 1.4$    $h =$ air To derive a crossplot for the test well data, the constant n must first be determined. This determination can be made by determining the value of n which yields $S_w = 1.00$ in a known water zone. The constant n was thus found to be 1.4, a value which was used at each of the four depths, because all depths were known to be in the same formation. FIG. 16 illustrates the resulting crossplot, and the four points corresponding to the calculated values for the heat conductivity and volumetric heat capacity at the four measured depths. Table 5 summarizes the interpretation results for each of these depths from this crossplot.

TABLE 5

| Run No. | Depth, ft | $S_w$ | $S_g$ | $\phi$ | Remarks |
|---|---|---|---|---|---|
| 1 | 4473 | 0.46 | 0.54 | 0.37 | Gas zone |
| 2 | 4350 | 1.00 | 0.00 | 0.39 | Water zone |
| 3 | 4174 | 0.86 | 0.14 | 0.38 | Residual gas zone |
| 4 | 5730 | 0.98 | 0.02 | 0.38 | Water zone |

The saturations derived from the crossplot agreed with the results from the pulsed neutron log. The porosities from the crossplot agreed with data obtained from nearby wells. Total error in saturation measurements was $\pm 12\%$, and in porosity measurements was $\pm 11\%$.

This crossplot method may also be inverted, i.e., the thermal properties may be inferred from the petrophysical properties, if the latter are known or measured by other means. Such a determination of thermal properties can be useful, for example, in thermal recovery operations.

Figure 17:
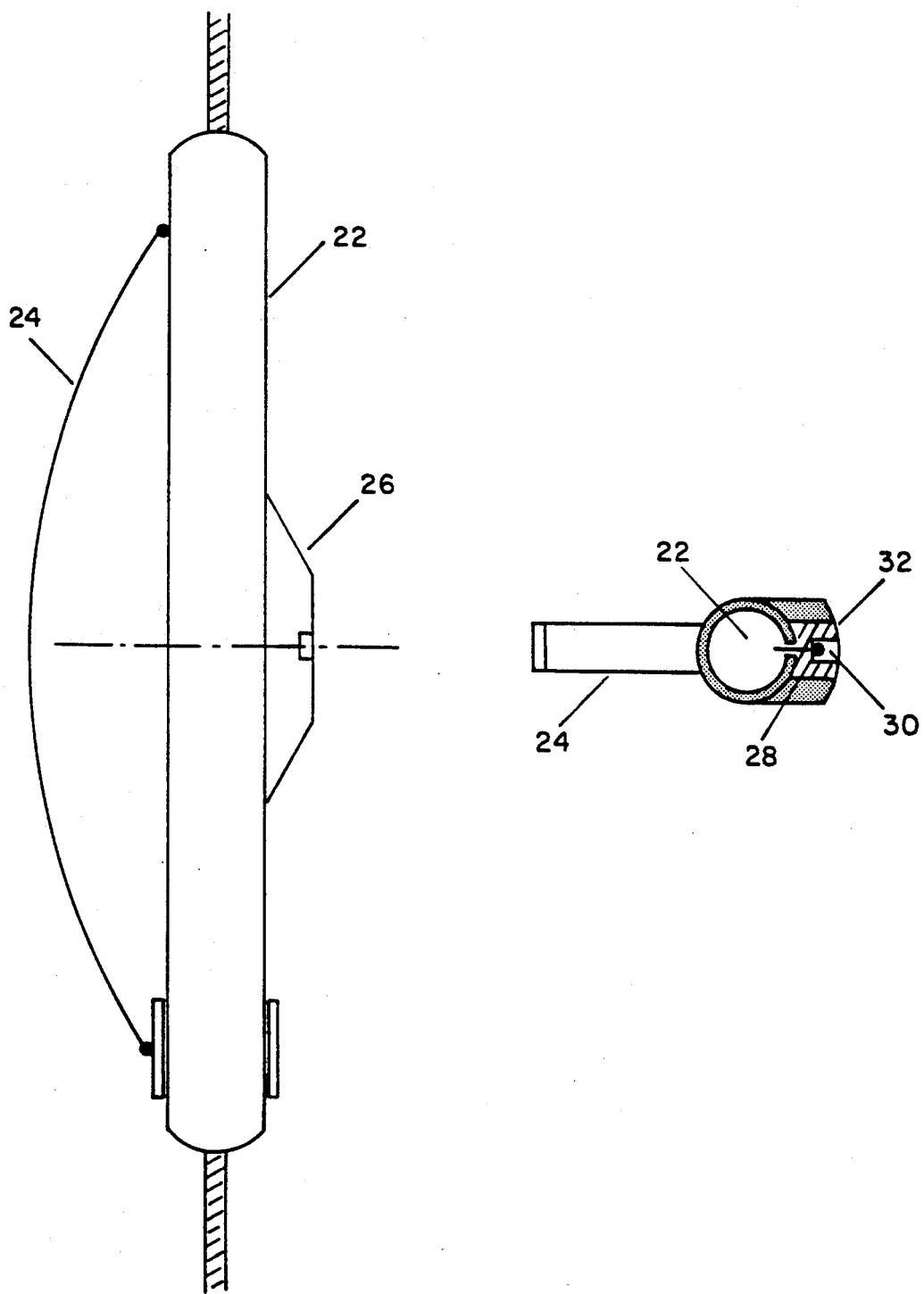
FIG. 17 illustrates a preferred form of temperature sensor.

A preferred form of temperature sensor for use in this invention is illustrated in FIG. 17. An elongated sonde body 22 is built to be movably placed in the bore hole, for example with bow spring 24. On the sonde is mounted a shoe or pad 26. A temperature-sensitive transducer 28 is in thermal contact with a small knob 30 made of a thermal conductor such as silver or copper, the knob being largely encased in a thermal insulator 32. An exposed portion of the knob contacts the formation or the casing. This combination allows rapid response by the transducer to changes in temperature.

Figure 18:
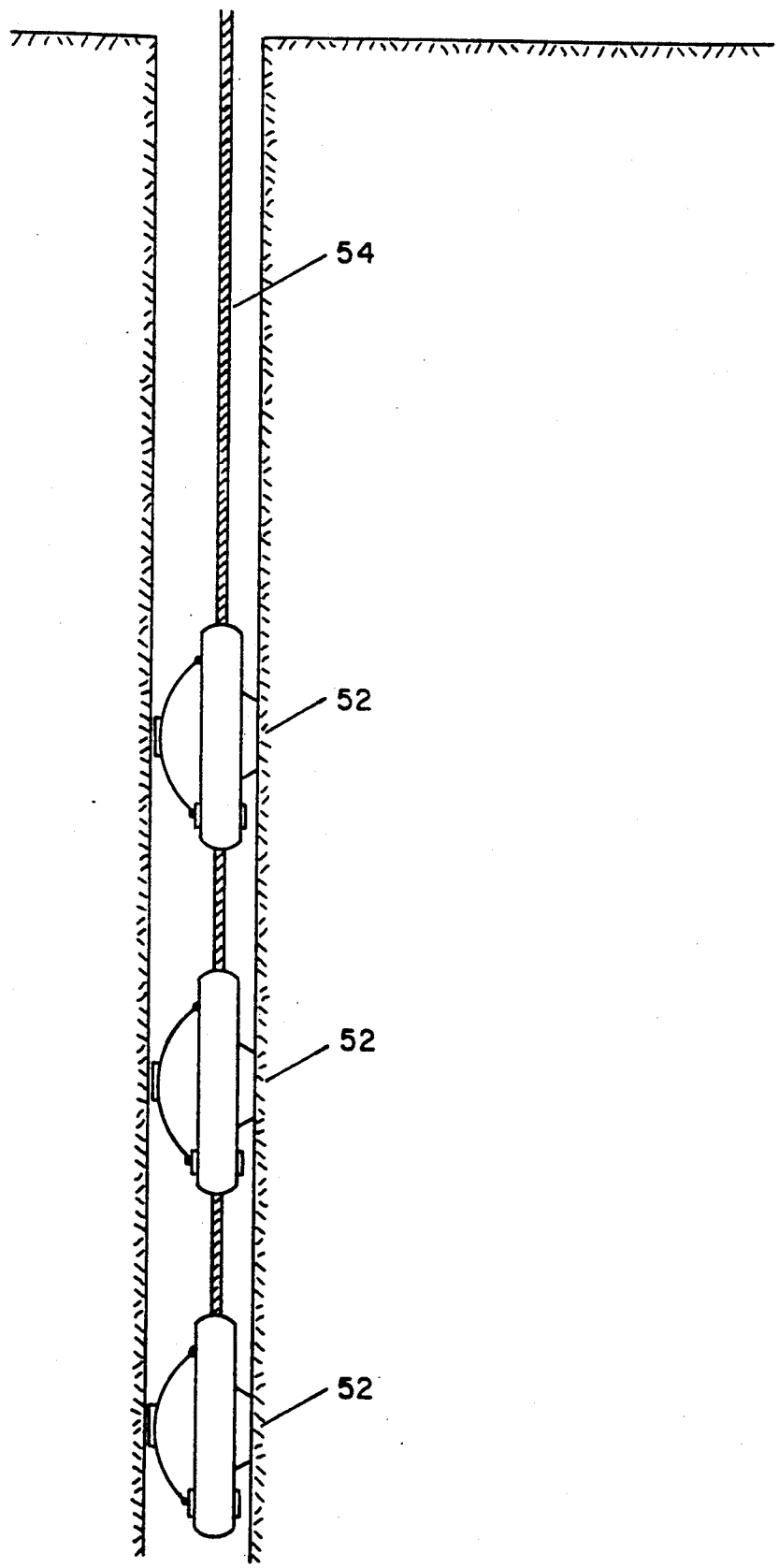
FIG. 18 illustrates a movable apparatus for measuring temperatures at several depths simultaneously.

The method of this invention may be used by measuring the temperature with an apparatus which may be moved through a range of depths, and recording the temperature as a function of depth; where the depth of the measurement is, in turn, a function of time. Such an apparatus may have a single thermometer element; or preferably it may have several thermometer elements spaced vertically on a cable. The latter embodiment is illustrated in FIG. 18. Preferably there are three, four, or five such thermometer elements 52, spaced twenty to one hundred feet apart from one another on cable 54.

A survey with an apparatus such as shown in FIG. 18 is made by lowering or raising the cable in a bore hole at a relatively slow speed. The speed is selected so that a desired period of time elapses between temperature measurements at a given depth by two adjacent thermometers on the cable. The temperatures measured by the different thermometers at the same depth, but at different times, will generally differ slightly. For example, if the cable is lowered at 500 feet per hour, and the spacing between adjacent thermometers is 100 feet, then the time interval between successive measurements at a particular depth will be 12 minutes.

Temperature measurements at a given depth, at slightly different times, can yield not only the temperature measurements themselves, but also simultaneously the slope of the temperature buildup curve, facilitating an interpolation of points on the temperature buildup curve between the measured points. See the example illustrated in FIG. 19. An advantage of this approach is that it allows multiple temperature buildup curves to be measured at closely spaced depth intervals—perhaps only 0.5 to 1.0 foot apart from one another. The number of measurements taken at each depth will generally be fewer than would be the case with a stationary thermometer; but reasonably accurate interpolations should be possible through measurements of not only the temperature at each depth, but also of the slope of the temperature buildup curve as discussed above. Of course, the several thermometer elements should be calibrated closely to one another to permit accurate measurements of relatively small changes in temperature over relatively short times.

The time intervals between successive runs of the cable through the zone of interest need not be identical. Because of the asymptotic convergence of a typical temperature buildup curve, the measurements may be made initially at shorter intervals, and subsequently at longer intervals. For example, the first run could be made just after fluid circulation stops; the second, one hour later; the third, two hours later; the fourth, four hours later; the fifth, eight hours later; and the last, sixteen hours later.

Figure 19:
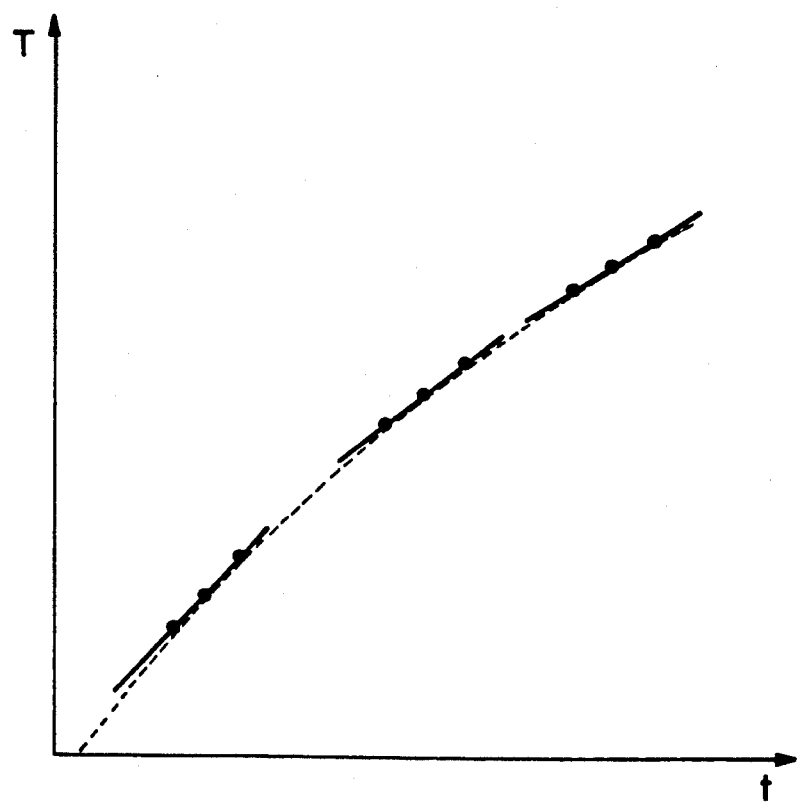
FIG. 19 illustrates an interpolation of points on a temperature buildup curve from individual measurements made with an apparatus such as that illustrated in FIG. 18.

FIG. 19 illustrates schematically the interpolated temperature buildup curve at one depth. The points are those measured during successive runs of the cable, and the curve is interpolated to those measured points, using both the measured temperatures and the derived slopes of the curve, as discussed above. Similar temperature buildup curves for other depths may be constructed throughout the zone of interest.

The thermal conductivity and heat capacity at each of the measured depths may then be determined from this set of curves. The derived values for thermal conductivity and heat capacity may then be plotted as a function of depth. Similarly, porosity and hydrocarbon saturation or other saturation may be calculated at each depth, for example by the crossplot technique discussed above. The derived values for these parameters may then also be plotted as a function of depth, which should assist in formation evaluation.

"Perturbing the temperature of a vertical zone" of a formation means to perturb the temperature of the formation over some range of depths, wherein the range of depths is sufficient that vertical heat flux becomes relatively insignificant compared to horizontal heat flux at at least one depth within that range. "Relatively insignificant" means that any vertical heat flux does not substantially affect the value of one or more measured thermal properties at that depth. "Vertical" means a direction substantially parallel to the axis of the bore hole; and "horizontal" means a direction substantially perpendicular to the axis of the bore hole. "Vertical heat flux" means that component of the heat flux in the vertical direction, and "horizontal heat flux" means that component of the heat flux in the horizontal direction. A "thermal property" is one or more of the following: thermal conductivity, thermal diffusivity, heat capacity, or volumetric heat capacity.

In context, "hydrocarbon" may mean oil, natural gas, or air.

Additional discussion concerning the methods and techniques of the present invention may be found in Xu, "Formation Evaluation Using Temperature Buildup Curves," Ph.D. Dissertation, Louisiana State University (May 1990), which is incorporated by reference.

We claim:

1. A method for determining and using the hydrocarbon saturation of a formation, comprising the steps of:
    (a) perturbing the temperature of a vertical zone of the formation;
    (b) measuring the heat flow rate q in the formation during said perturbing;
    (c) measuring the temperature T of the formation at a plurality of times t after said perturbing;
    (d) calculating the heat conductivity k of the formation from a first mathematical relationship, which relationship correlates values of k to the values of q, T, and t;
    (e) determining the thermal diffusivity $\alpha$ of the formation;
    (f) deriving the volumetric heat capacity $\rho c$ of the formation from a second mathematical relationship of the form $\rho c = k/\alpha$;
    (g) calculating correlations of values of hydrocarbon saturation to the values of volumetric heat capacity $\rho c$ and thermal conductivity k through a third mathematical relationship;
    (h) estimating the value of the hydrocarbon saturation from said measured values of the volumetric heat capacity $\rho c$ and thermal conductivity k, and said correlations; and
    (i) producing hydrocarbons from the formation if the estimated value of the hydrocarbon saturation indicates that such production is desirable.

2. A method as recited in claim 1, wherein said first mathematical relationship has the following form:
    (a) $k = fq/m$;
    (b) f is a constant, or a parameter dependent on the length of time following said perturbing;
    (c) m is the slope of an approximately linear portion of a plot of T versus log ($t_H$);
    (d) $t_H = t/t_p + t$; and
    (e) $t_p$ is the total time of said perturbing.

3. A method as recited in claim 1, wherein said perturbing step comprises exchanging heat between the formation and a fluid in thermal contact with the formation.

4. A method as recited in claim 1, wherein said temperature measuring is performed with an apparatus having at least two temperature sensors positioned at at least two depths, and wherein said apparatus is moved through said vertical zone; so that temperatures at different depths within said vertical zone are measured; and so that the temperature of at least one depth within said vertical zone is measured at different times; whereby the time rate of change of the temperature at that depth may be determined, and the temperature at that depth may be extrapolated to times when no direct measurement is made at that depth.

5. A method as recited in claim 1, wherein said third mathematical relationship has the form:

$$\rho c = (1-\phi)\rho_m c_m + \phi S_w \rho_w c_w + \phi S_h \rho_h c_h$$

$$\log(k) = (1-n\phi)\log(k_m) + n\phi \log(k_h S_h + a_w S_w)$$

$$S_h + S_w = 1$$

wherein
- $\phi$ is the formation porosity;
- $\rho_m c_m$ is the rock matrix volumetric heat capacity;
- $S_w$ is the water saturation;
- $\rho_w c_w$ is the water volumetric heat capacity;
- $S_h$ is the hydrocarbon saturation;
- $\rho_h c_h$ is the hydrocarbon volumetric heat capacity;
- $k_m$ is the rock matrix thermal conductivity;
- $k_h$ is the hydrocarbon thermal conductivity;
- $k_w$ is the water thermal conductivity; and
- n is a number between 1 and 2 whose value is determined empirically from core analysis or other estimate.

6. A method as recited in claim 1, wherein:
 (a) said correlations calculating step comprises calculating correlations of hydrocarbon saturation and the porosity of the formation to the values of volumetric heat capacity $\rho$ and thermal conductivity k through the third mathematical relationship;
 (b) said estimating step comprises estimating the value of the hydrocarbon saturation and the porosity from said measured values of the volumetric heat capacity $\rho$ and thermal conductivity k, and said correlations; and
 (c) said producing step comprises producing hydrocarbons from the formation if the estimated values of the hydrocarbon saturation and porosity indicate that such production is desirable.

7. A method as recited in claim 1, wherein the thermal diffusivity $\alpha$ is determined by comparing:
 (a) values of the temperature T at different times t for different values of $\alpha$ calculated from a fourth mathematical relationship, to
 (b) the measured temperature T at different times t, and determining the value of $\alpha$ which gives the best statistical fit between said calculated temperature values and said measured temperature T.

8. A method as recited in claim 7, wherein said perturbing is performed in a wellbore in the formation, said wellbore having a certain radius, and wherein said fourth mathematical relationship is of a form equal to or approximately equal to:

$$T_D = \frac{4}{\pi} \int_0^\infty \frac{(1 - e^{-u^2 t_D})du}{u^3\{[auJ_0(u) - J_1(u)]^2 + [auY_0(u) - Y_1(u)]^2\}}$$

wherein:
- a is the wellbore storage factor;
- $J_0$ is the first kind Bessel function of zero order;
- $J_1$ is the first kind Bessel function of first order;
- $Y_0$ is the second kind Bessel function of zero order;
- $Y_1$ is the second kind Bessel function of first order;
- $T_D = 2\rho k/q(T_i - T)$;
- $\rho$ is the density of the formation;
- u is a dummy integration variable;
- $T_i$ is the formation temperature before said perturbing;
- $t_D = \alpha t/r_w^2$; and
- $r_w$ is the wellbore radius.

9. A method as recited in claim 8, wherein said calculated temperature relationship is approximated by a relationship of the form:

$$T_D = a_0 + a_1(\log t_D) + a_2(\log t_D)^2 + a_3(\log t_D)^3$$

wherein $a_0$, $a_1$, $a_2$, and $a_3$ are constants whose values are determined by a least squares fit other statistical fit to said calculated values of the temperature.

* * * * *